(12) United States Patent
Kojima et al.

(10) Patent No.: US 6,804,186 B2
(45) Date of Patent: Oct. 12, 2004

(54) OPTICAL PICKUP OF TILT CONTROL TYPE

(75) Inventors: Kouki Kojima, Fukuoka (JP); Shogo Horinouchi, Fukuoka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 456 days.

(21) Appl. No.: 09/860,583

(22) Filed: May 21, 2001

(65) Prior Publication Data

US 2002/0001282 A1 Jan. 3, 2002

(30) Foreign Application Priority Data

May 24, 2000 (JP) ........................................ 2000-152392

(51) Int. Cl.[7] ................................................. G11B 7/00
(52) U.S. Cl. ................................................. 369/112.02
(58) Field of Search .......................... 369/44.23, 44.32, 369/53.19, 112.02, 94

(56) References Cited

U.S. PATENT DOCUMENTS

| | | | |
|---|---|---|---|
| 5,734,637 A | * 3/1998 | Ootaki et al. | ........... 369/112.02 |
| 5,923,636 A | 7/1999 | Haruguchi et al. | |
| 5,936,923 A | 8/1999 | Ootaki et al. | |
| 6,078,554 A | 6/2000 | Ootaki et al. | |
| 6,125,088 A | 9/2000 | Ogasawara | |
| 6,141,304 A | 10/2000 | Ogasawara | |
| 6,246,648 B1 | * 6/2001 | Kuribayashi | ............. 369/53.19 |
| 6,480,454 B1 | * 11/2002 | Wada et al. | ........... 369/112.02 |
| 2001/0028028 A1 | 10/2001 | Iwasaki et al. | |

FOREIGN PATENT DOCUMENTS

| | | |
|---|---|---|
| JP | 10124909 | 5/1998 |
| JP | 11110802 | 4/1999 |
| JP | 2000 090479 | 3/2000 |
| JP | 2001-006203 | 1/2001 |
| JP | 2001-034996 | 2/2001 |
| JP | 2001-043559 | 2/2001 |

* cited by examiner

Primary Examiner—Thang V. Tran
(74) Attorney, Agent, or Firm—Stevens, Davis, Miller & Mosher, LLP

(57) ABSTRACT

An optical pick-up composed of an objective lens and a liquid crystal element, for recording and reproduction of optical discs having different recording densities, the liquid crystal element having nine zones, including: zones 2, 4 located in center parts of half circles of a small diameter beam for a low density optical disc, zones 3, 5 laid along the outer peripheries of zones 2, 4 within the half circles so as to surround zones 2, 4, zones 6, 7 along the outer peripheries of zones 3, 5, between the outer periphery of the small diameter beam and a large diameter beam, extending along substantially half circumferential parts of the small diameter beam, zones 8, 9 extending along substantially half circumferential parts of the large diameter beam, a remainder first zone and including a diameter whose the direction is the same as a tilt direction to be corrected.

47 Claims, 6 Drawing Sheets

DIAMETER OF OBJECTIVE LENS

OPTICAL PICKUP OF TILT CONTROL TYPE

BACKGROUND OF THE INVENTION

1. Field of the Invention

The present invention relates to an optical disc units for reproducing data recorded on any of different density recording media such as a high density optical disc or a compact disc, or recording data on the recording medium, and also related to an optical pick-up used in an optical disc unit and using a liquid crystal element.

2. Description of the Related Art

First, explanation will be made of a liquid crystal display element used in a conventional optical pick-up in a DVD unit. Referring to FIG. 8 which is a plan view illustrating an electrode pattern for liquid crystal in a conventional liquid crystal display element, the electrode pattern is composed of three divided zones, that is, a reference zone ②, and zones ① and ③ which are applied thereto respectively with voltages that is equal to each other, but having opposite polarities so as to cause a phase difference in transmitted light beams passing through the zones ① and ③ with respect to the reference zone ②.

Next, referring to FIG. 9 which is a perspective view illustrating an optical pick-up on which the liquid crystal element shown in FIG. 8 is mounted, the optical pick-up is composed of a semiconductor laser 15, a beam splitter (which will be herein below simply denoted as "BS") 16, a collimator lens 17, a rise-up miller 18, the liquid crystal element 19, an objective lens 20, a detection lens 21, and a detector 22. Further, the semiconductor lens 15 emits a laser beam having a wavelength of 650 nm, which is then transmitted through the BS 16 and then through the collimator lens 16 so as to be turned into a parallel ray beam. The parallel ray beam is totally reflected by the surface of the mirror 18, and is then transmitted through the liquid crystal element 19. As mentioned above, at this stage, phase differences are caused by beams transmitted through the zone ① and the zone ③ with respect to a beam transmitted through the zone ②. Further, these beams are focused by the objective lens 20 into a photo spot on an optical disc.

Next, a reflected beam from the optical disc is incident upon the BS 16 after passing along the path reverse to the above-mentioned path. At this stage, by passing through the liquid crystal element 19, the above-mentioned phase differences are again caused. Thereafter, the reflected beam again reflected by the BS 16 is focused by the detecting lens 21 and is then received by the detector 22.

Thus, with the DVD pick-up in which the liquid crystal display element 19 having the electrode pattern composed of the three zones is located on the optical path between the collimator lens 17 and the objective lens 21, an optical disc can be subjected to tilt correction.

It is noted here that the tilt doses means such a condition that the optical beam focused by the objective lens 20 is incident upon a data recording surface (more precisely, a recoding layer) of the optical disc at an angle other than 90 deg. (that is, the optical axis is inclined). Further, the correction of an optical system from the tilt condition into a condition in which the optical axis is incident upon the surface of the optical disc, ideally perpendicular thereto by carrying out any control is so-called as the tilt correction.

However, the liquid crystal element having the above-mentioned conventional electrode pattern as mentioned above, has been adapted to be used for DVD discs. However, there has been presented such a problem that, an optical pick-up for recording and reproduction of optical discs having different recording densities, can carry out the above-mentioned tilt correction can not for all of them but for only one of them.

SUMMARY OF THE INVENTION

An object of the present invention is to provide an optical pick-up which can carry out tilt correction for each of optical discs having different recording densities, and which can enlarge the tilt margin for the optical discs, and reduce the accuracy for assembly and adjustment of the pick-up, and manhours for the assembly and the adjustment, and to provide an optical disc unit using such an optical pick-up.

The present invention is devised in order to solve the above-mentioned problems, and accordingly, there is provided an optical pick-up composed of an objective lens and a liquid crystal element in combination, for recording and reproduction of optical discs having different recording densities, characterized in that the liquid crystal element has an electrode pattern divided into five zones including second and third zones which are located respectively in center parts of half circles of a small diameter beam for a low density optical disc, fourth and fifth zones which are located substantially in the half circles of the small diameter beam along the outer peripheral parts of the second and third zones so as to surround the second and the third zones, respectively, and a first zone which are the remaining zone other than the second to fifth zones, including the diameter, the direction of the diameter included in the first zone is the same as a tilt direction to be corrected.

DESCRIPTION OF THE PREFERRED EMBODIMENT

Embodiment 1

Figure 1A:
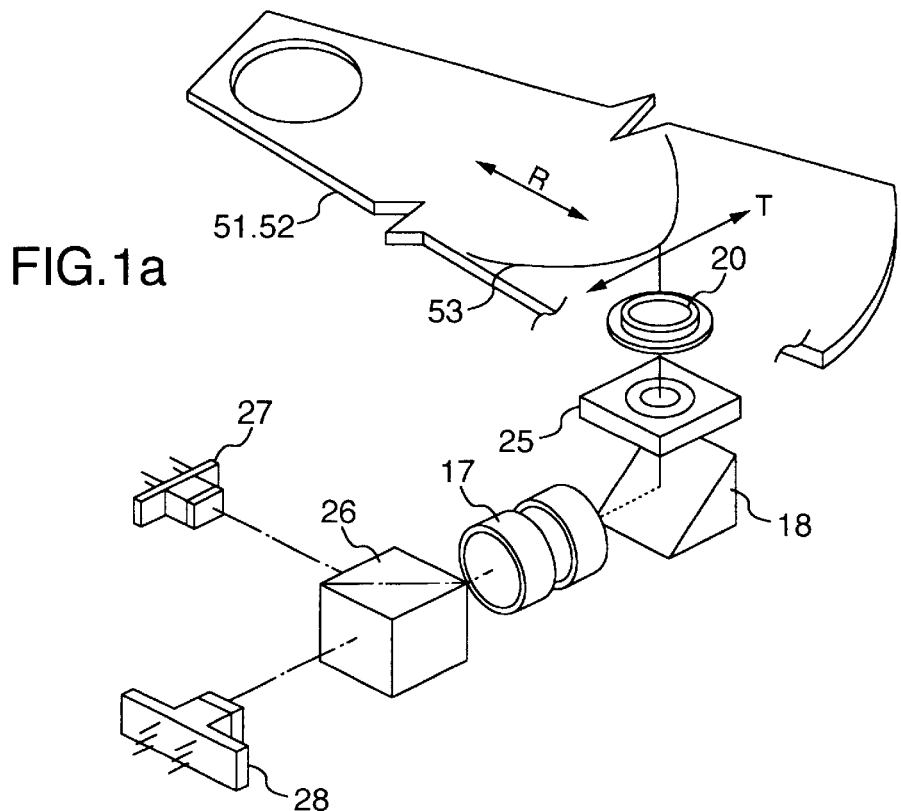
FIG. 1a is a perspective view illustrating an optical pick-up device incorporating a liquid crystal element in an embodiment of the present invention.

First, explanation will made of an embodiment of the present invention with reference to the drawings. Referring to FIG. 1a which is a schematic perspective view illustrating an optical pick-up in its entirety, there are shown a low density optical disc (for example, a CD for long wavelength) 51, a high density optical disc 52 (for example, a DVD for short wavelength) and an arc 53 as a track (typically shown). The direction tangential to the arc 53 is tangential to the optical discs 51, 52, and is indicated by the arrow T. Further, the radial direction of the optical discs 51, 52 is indicated by the arrow R.

Further, there are sown a liquid crystal element 25, a short wavelength optical unit 27 and, a long wavelength optical unit 28. Each of the optical units 27, 28 is composed of a light source such as a semiconductor laser, a light receiving element and optical components. The optical sources in both optical units 27, 28 emit light beams having different wavelengths. Further, there is shown a beam splitter (BS) 26. In the configuration of the embodiment 1 of the present invention, this beam splitter 26 reflects thereon a light beam having a short-wavelength but transmits therethrough a light beam having a long wavelength.

It is noted that the optical units 27, 28 may be arranged in any of various ways, without being limited to the arrangement shown in FIG. 1a if the light beams emitted from the optical units 27, 28 can enter into the collimator lens 17 by way of the BS 26. Further, the liquid crystal element 25 may be arranged at any position on the optical path between the BS 26 and the objective lens 26.

It is noted that the technical configurations of these optical units 27, 28 and the BS 26 are technically disclosed in detail in the U.S. Pat. No. 5,923,636, and are not essential in the technical concept of the present invention, and accordingly, detailed description thereto will be omitted in this specification. Further, the collimator lens 17, the rise-up mirror 18 and the objection lens 20 are the same as those which have been explained in the related art as mentioned above.

Figure 1B:
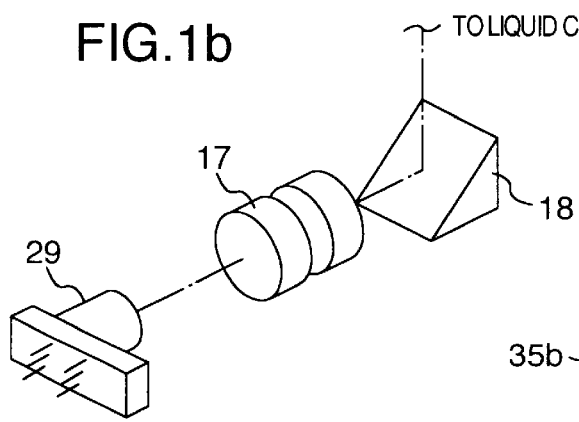
FIG. 1b is a perspective view illustrating a part of an optical pick up device using a different power source.

Referring to FIG. 1b, explanation will be made of an example in which another light source is used, instead of the light source shown in FIG. 1a. In FIG. 1b, there is shown a double wave-length light source 29 composed of two light sources respectively including semiconductor lasers for emitting light beams having different wavelengths, and a light receiving element and optical components. The semiconductor laser emitting a light beam having a long wavelength is used for recording and reproduction of a low density disc (such as a CD for long wavelength) 51, but the semiconductor laser emitting a light beam having a short wavelength is used for recording and reproduction of a high density optical disc (such as a DVD for short wavelength) 52. In comparison with FIG. 1a, the necessity of the BS 26 can be eliminated in the configuration shown in FIG. 1b, thereby, it is possible to simplify the structure of the optical pick-up. Further, the condition of the arrangement of the liquid crystal element 25 is the same as that shown in FIG. 1a.

Figure 1C:
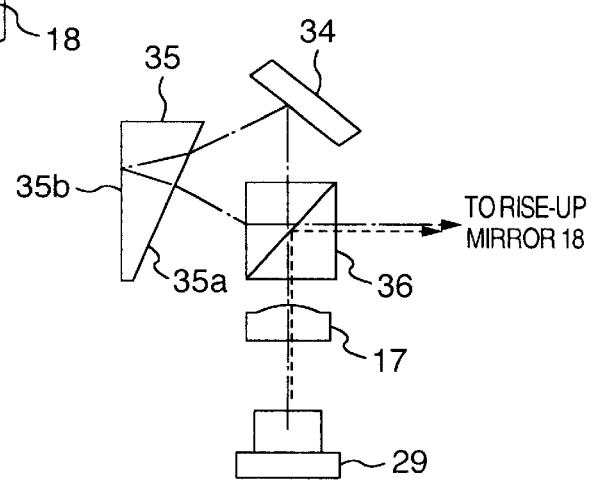
FIG. 1c is a plan view illustrating an optical pick-up device using another power source.

Referring to FIG. 1c which is a view for explaining an example using another light source, instead of the light source shown in FIG. 1a, there are shown the above-mentioned double wavelength optical unit 29, a reflecting mirror 34 which reflects thereon a beam having a short wavelength, and a beam shaping prism 35 upon which the reflected beam from the reflecting mirror 34 is incident at a desired angle, having an incident surface 35a and a reflecting surface 35b, and a beam splitter (BS) 36 which reflects a beam having a long wavelength but transmits therethrough a beam having a short wavelength in the configuration shown in FIG. 1c.

With the arrangement as mentioned above, the emitted beam having a long wavelength (whose optical path is shown as a dotted line) is reflected on the BS 36, and thereafter is incident upon the low density optical disc 51 (for example, a CD for a long wavelength) by way of the rise-up mirror 18, the liquid crystal element 25 and the objective lens 20. The reflected beam from the disc 51 is detected by the double wavelength optical unit 29 after passing on the optical path in the reverse order. Meanwhile, a light beam having a short wavelength (whose optical path is indicated by the one-dot chain line) is transmitted through the BS 26, and is then reflected on the reflecting mirror 34. Further, it is incident upon the incident surface 35a of the beam shaping prism 35 so as to be refracted. Further, the refracted beam is reflected on the reflecting surface 35b and is then refracted by the incident surface 35a, and then, it is emitted from the beam shaping prism 35. Then, it passes through the BS 36, and is incident upon the high density optical disc (for example, a DVD for a short wavelength) 52. The reflected beam from the optical disc 52 is then detected by the double wavelength optical unit 29 after passing through the optical path in the reverse order. In the above-mentioned arrangement, if the light source shown in FIG. 1c, is arranged in parallel with the surface of the optical disc 51, or 52, the emitted beam having a short wavelength from the double wavelength optical unit 29 is shaped more effectively, so that a radial intensity distribution becomes highly uniform. Further, the condition of the arrangement of the liquid crystal element 25 is the same as that of the arrangement shown in FIG. 1a.

Figure 2:
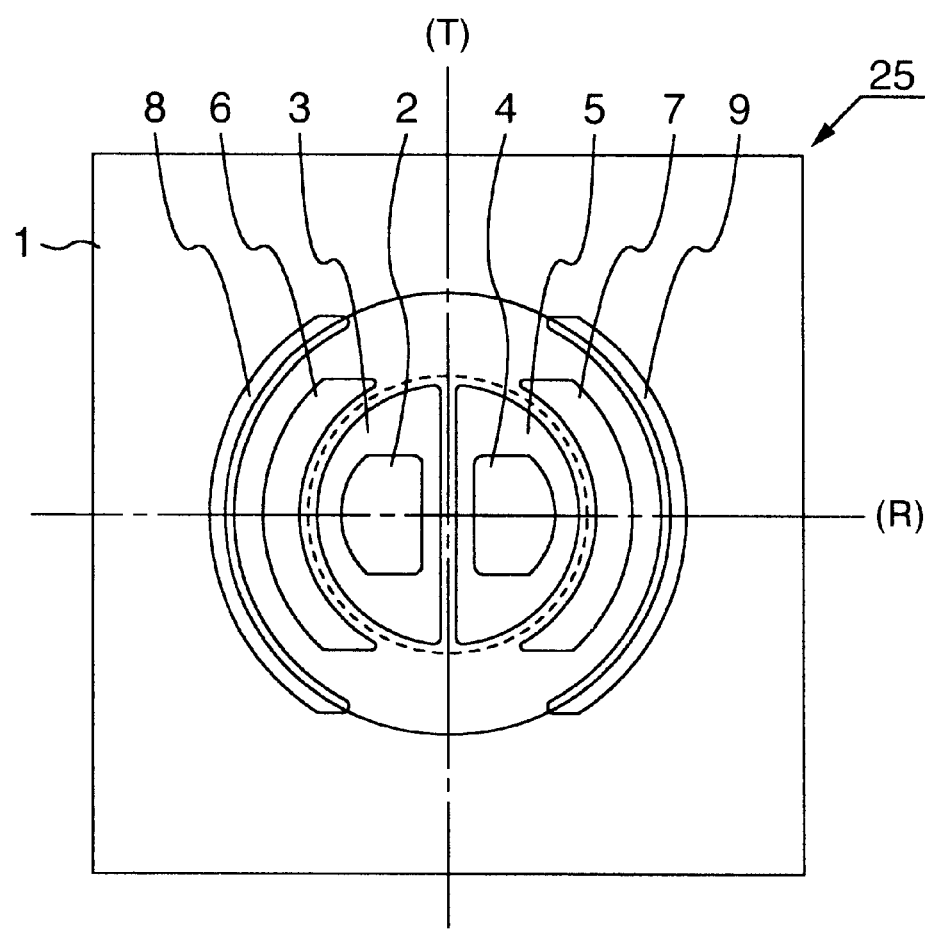
FIG. 2 is a view illustrating an electrode pattern of a liquid crystal element in an embodiment of the present invention.

Referring to FIG. 2 which is a plan view illustrating an electrode pattern of the liquid crystal element in the embodiment 1 of the present invention, a circular beam transmitted through the liquid crystal element, for the high density optical disc (for example, a DVD for a short wavelength) is exhibited by a solid line circle, and a circular beam transmitted through the liquid crystal element, for the low density optical disc (for example, a CD for long wavelength) is exhibited by the broken line within the solid line. In this figure, there are shown a reference voltage zone 1, that is, a first zone which is a remaining zone other than the zones 2, 3, 4, 5, 7, 8, 9 and including a diameter whose direction is at right angles to a tile direction to be corrected. Four ranges 2, 3, 4, 5 located within the circular beam for the low density optical disc, and four zones 6, 7, 8, 9 located outside of the circular beam for the low density optical disc.

The zones 2, 3 and the zones 4, 5 within the circular beam for the low density optical disc are faced to each other, respectively, on opposite sides of the center line of the circular beam, the zone 3 being laid along the periphery of the zone 2 while the zone 5 is laid along the periphery of the zone 4. Four zones 6, 7, 8, 9 arranged outside of the circular beam for the low density optical disc, are arranged in a direction the same as a tilt direction of the disc to be corrected. That is, in the case shown in FIG. 2, they are arranged in the direction R of the abscissa, and accordingly, this liquid crystal element 25 can perform tilt correction in the radial direction R in FIG. 1.

Explanation will be made of the tilt correction for the optical disc with the use of the liquid crystal element having the electrode pattern as mentioned above. The zones 2, 3, 6, 9 and the zones 4, 5, 7, 8 are applied thereto with voltages having opposite polarities with respect a reference voltage applied to the zone 1. Further, the absolute values of voltages applied to the zones 2, 9, 4, 8 are set to be equal to one another, and the absolute values of the voltages applied to the zones 3, 6, 5, 7 are set to be equal to each other while the voltage applied to the zones 2, 9, 4, 8 is higher than that applied to the zones 3, 6, 5, 7.

Figure 3:
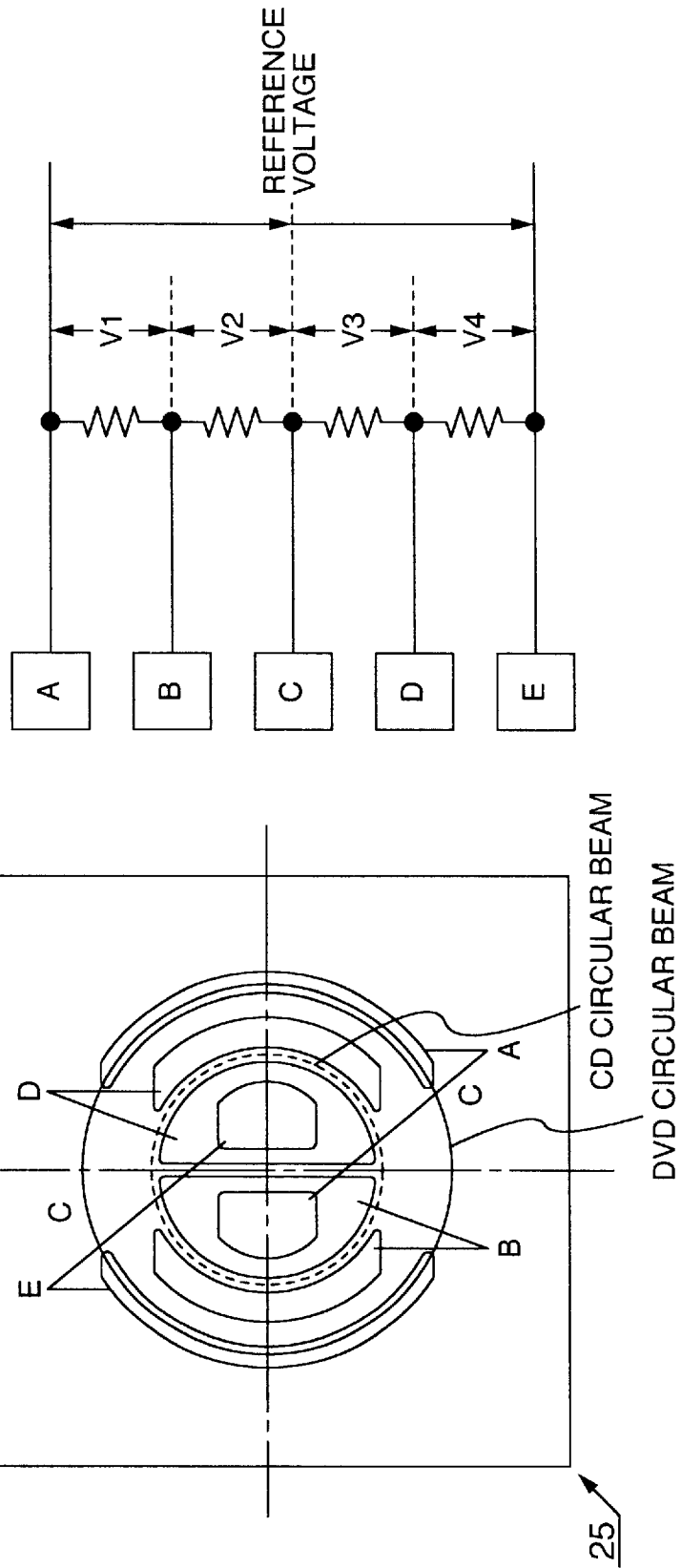
FIG. 3 is a view for explaining voltages applied to the liquid crystal element shown in FIG. 2.

Next, explanation will be made of the relationship between the zones of the liquid crystal element and the applied voltages. Referring to FIG. 3 which is a view for explaining the applied voltages of the liquid crystal element 25 shown in FIG. 2, since the liquid crystal element shown in FIG. 3 is the same as that shown in FIG. 2, like reference numerals are use to denote like parts shown in FIG. 2 in order to omit the detailed description thereto. Further, the total voltage V (which is an AC effective voltage) is divided into four stages partial voltages V1 to V4 which are produced at terminals A to E. The partial voltage at the terminal A is applied to the zones 2 and 9, the partial voltage at the terminal B is applied to the zones 3, 6, the partial voltage at the terminal C is applied to the zones 1, and the partial voltage at the terminal D is applied to the zones 5, 7, and the partical voltage at the terminal E is applied to the zones 4, 8 respectively. FIG. 3 shows the connection mentioned above, instead of reference numerals denoting these zones.

In addition, the total voltage V (which is an AC effective voltage) is set in a voltage range where the liquid crystal element in its entirety causes linear phase change for the light beam transmitted therethrough with respect an applied voltage. Accordingly, for example, if the total voltage is set to 5 V, and the voltage at the terminal C is used as a reference voltage, the partial voltage at the terminal C becomes a middle point of the total voltage, and the voltage between the terminals A and C and the voltage between the terminals C and D have an equal absolute value but have opposite polarities. Further, preferably, the voltages between the terminals, are exhibited by the following relatonship:

$$V1 = -V4 = (\frac{1}{2})V2 = -(\frac{1}{2})V3$$

where V1 is a voltage between the terminals A and B, V2 is a voltage between the terminals B and C, V3 is a voltage between the terminals C and D, and V4 is a voltage between the terminals D and E.

In the above-mentioned condition, there is shown such an example that the total voltage V is maintained to be constant, but the relative voltages V1 to V4 between the terminals may be changed by changing resistance values. Alternatively, there may be used such a control method that the total voltage is variable (for example, from 0 to 5V) while the phase is changed, or with the provision of a neutral point (for example, terminal C), the phase of the total voltage is changed. Further, these control methods may be combined.

At this time, phase differences are caused in accordance with voltage applied to light beams transmitted through the zones, which reduce wave front aberration caused by a tilt of the optical disc so as to effect the tilt correction. The correction for the tilts of the high density optical disc can be made by phase differences caused by light beams transmitted through the nine zones, and the correction for the tilt of the low density optical disc can be made by phase differences caused by light beams transmitted through the zones 1, 2, 3, 4, 5 within the circular beam for the low density optical disc. It is noted that the applied voltage is subjected to proportional control in accordance with a tilt value of the optical disc.

That is, with the use of such a fact that the refractive index of the liquid crystal element is changed (increased) in proportion to an applied voltage, the voltage applied to the liquid crystal is subjected to proportional control in accordance with a tilt value so that a tilt caused in the optical system is reversely corrected. Since the increased refractive index equivalently causes an increase in the optical path length, a tilt caused in the optical system can be reversely corrected by carrying out proportional correction for the applied voltage in accordance with a tilt degree.

Figure 4:
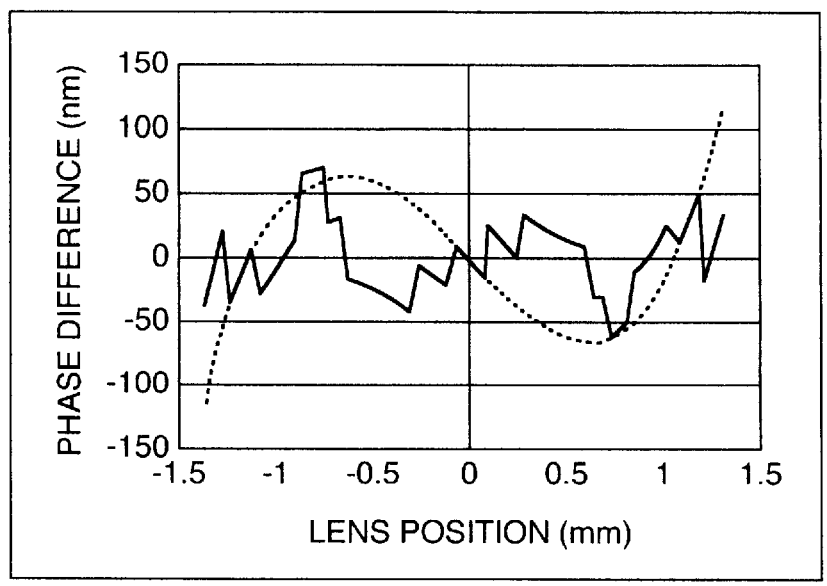
FIG. 4 is a graph illustrating wave front aberration subjected to tilt correction of an optical disc by a liquid crystal element.

Referring to FIG. 4 which is a view illustrating wave front aberration as to an optical disc subjected to tilt correction by the liquid crystal element, a distribution of wave front aberration of a DVD with a tilt value of 0.6 degrees and a distribution of wave front aberration after the tilt correction by the liquid crystal element according to the present invention, are shown. A dotted line curve exhibits a distribution of wave front aberration without tilt correction for 0.6 deg.

Meanwhile, the solid line curve exhibits an effect of the tilt correction (phase correction) according to the present invention. It is noted that the abscissa indicates a radial distance from the center (0 mm) to the outer periphery of the objective lens, and the ordinate indicates the phase difference. The ideal phase difference is exhibited by a flat curve having a 0 nm. As shown in the figure, a remarkably improved effect for the phase difference can be seen in the center part and the peripheral part of the objective lens.

Figure 5A:
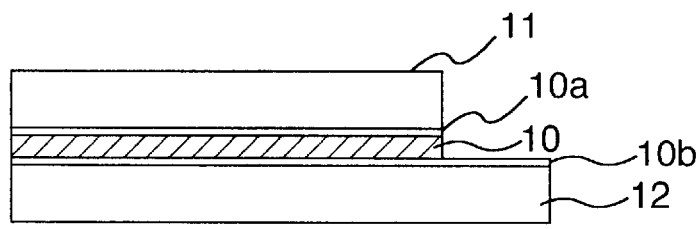
FIG. 5a is a sectional view illustrating a structure of a liquid crystal element in a first embodiment of the present invention.
Figure 5B:
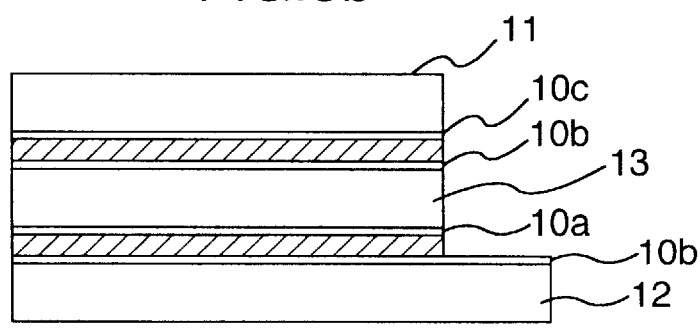
FIG. 5b is a sectional view illustrating a structure of a liquid crystal element in a variant form of the first embodiment of the present invention.

Referring to FIG. 5a which is a view for illustrating a structure of a liquid crystal element in an embodiment of the present invention, there are sown liquid crystal 10, glass substrates 11, 12 between which the liquid crystal 10 is held. The electrode patterns 10a, 10b as shown in FIG. 2 are formed on the glass substrates 11, 12, respectively, and the voltages as shown in FIG. 3 are applied to the electrode patterns, as mentioned above.

It is noted that the electrode patterns 10a, 10b, 10c for liquid crystal may be formed of two layers which are joined, orthogonal to each other, in accordance a direction in which the tilt correction is made. For example, a layer in the tracking direction (the radial direction of the disc) and a layer in the tangential direction (tangential to the track) are combined so as to enable the tilt correction in every direction.

Thus, the tilt correction for optical discs having different recording densities can be made. In particular, for the high density optical disc which is highly affected by a tilt thereof, the tilt margin for the optical disc can be enlarged by carrying out the tilt correction with the use of the liquid crystal element.

Further, the accuracy of the assembly and adjustment for the optical system and a mechanism for supporting the optical system can be adjusted by carrying out the tilt correction, and accordingly, the accuracy for the assembly and the adjustment can be reduced, and the manhours for the assembly and the adjustment can be reduced. Thus, an optical disc unit using the optical pick-up according to the present invention can enhance the function coping with optical discs having different recording densities, thereby it is possible to contribute to reduction in the costs.

Embodiment 2

Figure 6:
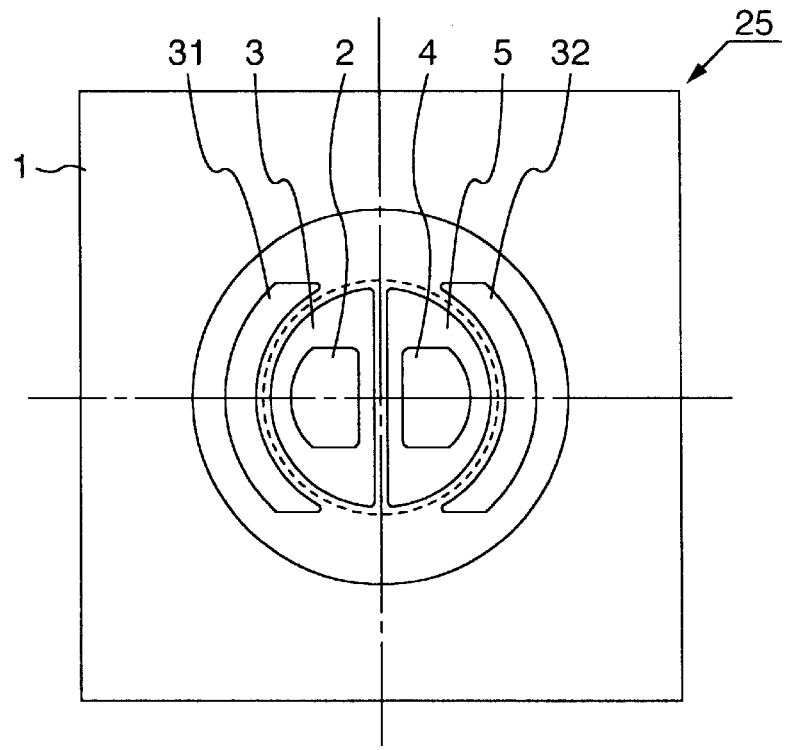
FIG. 6 is a view illustrating an electrode pattern of a second embodiment of the present invention.

Next, explanation will be made of an embodiment 2 with reference to FIG. 6 which is a view for illustrating a configuration of an electrode pattern in the liquid crystal element in the second embodiment of the present invention. Referring to FIG. 6, there are shown a zone 1 for a reference voltage, four zones 2, 3, 4, 5 within a circular beam for a low density optical disc, similar to those explained in the first embodiment, and accordingly, like reference numeral are used to denote like parts those explained in the embodiment 1 so as to omit the detailed explanation thereto. Outside of the circular beam, there are two zones 31, 32. A circular beam transmitted through the liquid crystal, for a high density optical disc (for example a DVD) is exhibited by the solid line circle in the figure, and a circular beam transmitted through the liquid crystal, for a low density optical disc (for example, a CD) is exhibited by the broken line curve. The zones 31, 32 are applied with the voltages equal respectively to the zones 3, 5 through the intermediary of the zone 1 for the reference voltage. A zone 1 is a remaining zone other than the zones 2, 3, 4, 5, 31, 32, and includes a diameter whose direction is at right angles to a tilt direction to be corrected. The zones 2 and 4, zones 3 and 5, and zones 31 and 32 are arranged, symmetric to each other, respectively, with respect to the direction of the diameter contained in the zone 1. The reference voltage is applied to the zone 1, the first voltage ($V_2$) is applied to the zones 3 and 31, the second voltage ($V_3$) is applied to the zones 5 and 32, the third voltage ($V_1$) is applied to the zone 2, and the fourth voltage ($V_4$) is applied to zone 4. The application of the voltages to the zones in this configuration and the tilt correction therefore are similar to those explained in the embodiment 1, and accordingly, the detailed description thereto will be omitted.

Embodiment 3

Figure 7:
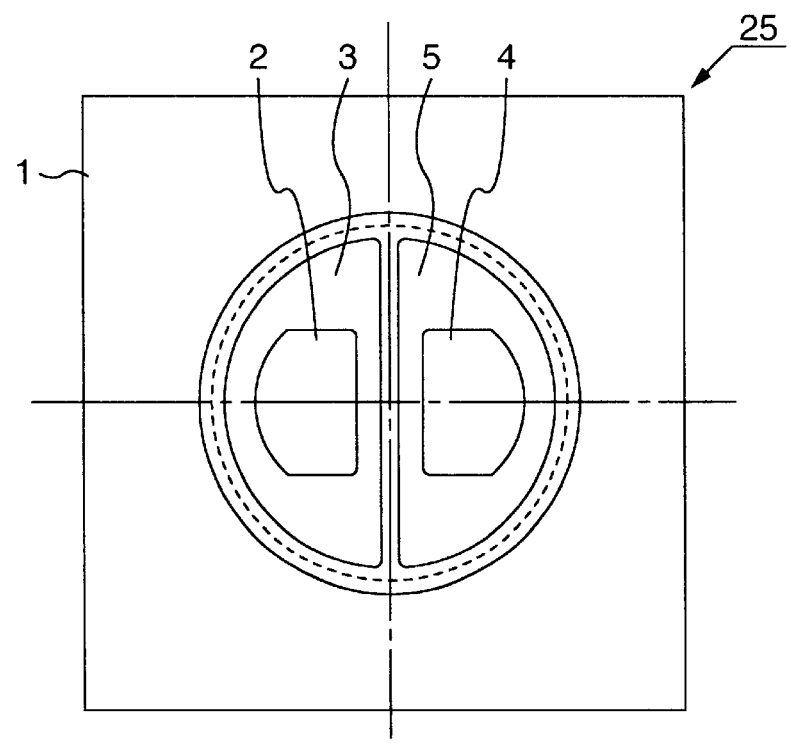
FIG. 7 is a view illustrating an electrode pattern of a liquid crystal element in a third embodiment of the present invention.
Figure 8:
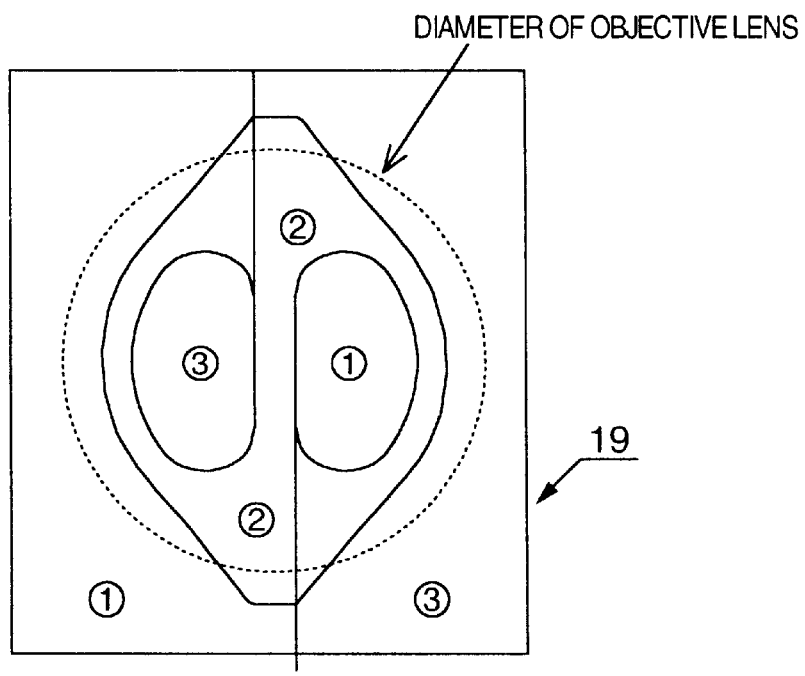
FIG. 8 is a view illustrating an electrode pattern of a conventional liquid crystal element.
Figure 9:
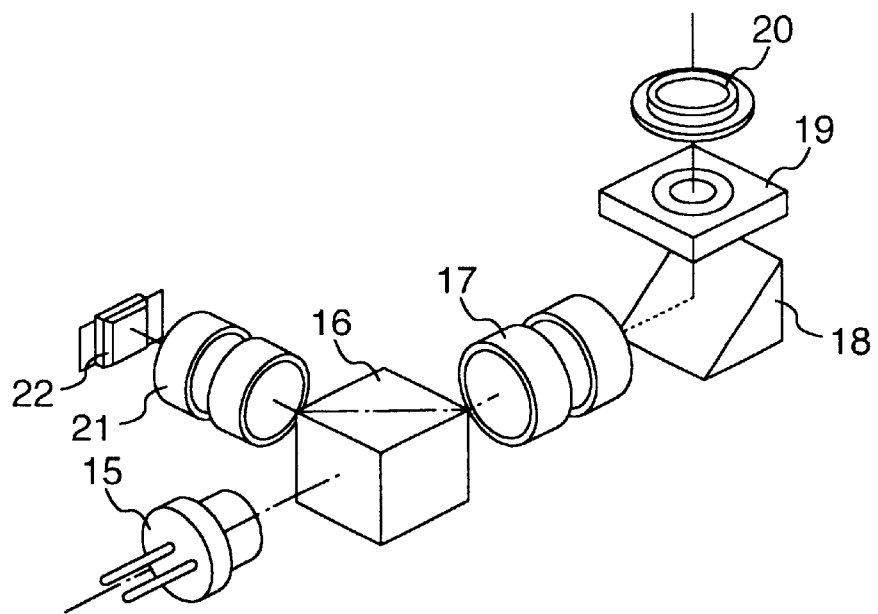
FIG. 9 is a view illustrating an optical pick-up device incorporating the liquid crystal element shown in FIG. 8.

Next, explanation will be made of an embodiment 3 of the present invention with reference to FIG. 7 which shows a configuration of an electrode pattern in a liquid crystal element in the embodiment 3. Referring to FIG. 7, a circular beam transmitted through the liquid crystal, for a high density optical disc (for example a DVD) is exhibited by the solid line circle in the figure, and a circular beam transmitted through the liquid crystal, for a low density optical disc (for example, a CD) is exhibited by the broken line circle. There are provided five zones, that is, a zone 1 for a reference voltage and zones 2, 3, 4, 5 within the circular beam for the low density optical disc. The direction of the diameter included in the first zone 1, which is the remaining zone other than the zones 2, 3, 4, 5, is at right angles to a tilt direction to be corrected. The zones 2 and 4, and zones 3 and 5, are arranged, symmetric to each other, respectively, with respect to the direction of the diameter contained in the zone 1. The reference voltage is applied to the zone 1, the first voltage ($V_2$) is applied to the zone 3, second voltage ($V_3$) is applied to the zone 5, the third voltage ($V_1$) is applied to the zone 2, and the fourth voltage ($V_4$) is applied to zone 4. The application of the voltages to the zones in this configuration and the tilt correction therefor are similar to those explained in the embodiment 1, and accordingly, the detailed description thereto will be omitted.

As mentioned above, according to the present invention, the tilt correction can be made for both optical discs having different recording densities, and accordingly, the tilt margin for the optical discs can be enlarged, and the accuracy for assembly and adjustment for the optical pick-up can be reduced and the man hours for the assembly and adjustment of the optical pick-up can be reduced. Thus, it is possible to contribute to the improvement for an optical disc unit using the optical pick-up according to the present invention, and to the enhancement of the function thereof coping with optical discs and the reduction of the cost thereof.

What is claimed is:

1. An optical pick-up composed of an objective lens and a liquid crystal element in combination, for recording and reproduction of optical discs having different recording densities, the liquid crystal element having five zones in total, including:

zones 2, 4 located in center parts of half circles of a small diameter beam for a low density optical disc, zones 3, 5 laid along the outer peripheries of the zones 2, 4 within the half circles, respectively, so as to surround the zones 2, 4, respectively, and a first zone which is a remaining zone other than the zones 2, 3, 4, 5 and including a diameter, wherein the direction of the diameter included in the first zone 1 is at right angles to a tilt direction to be corrected.

2. An optical pick-up as set forth in claim 1, characterized in that the zones 2 and 4, and zones 3 and 5 are arranged, symmetric to each other, respectively, with respect to the direction of the diameter contained in the zone 1.

3. An optical pick-up as set forth in claim 1, characterized in that there is provided voltage applying means for producing a reference voltage, a first voltage ($V_2$) having a predetermined potential difference from the reference voltage, a second voltage ($V_3$) having an absolute value equal to that of the first voltage but having a polarity reverse to that of the first voltage, a third voltage ($V_1$) having an absolute value greater than that of the first voltage, and a fourth voltage ($V_4$) having an absolute value equal to that of the third voltage and having a polarity reverse to that of the third voltage, the reference voltage is applied to the zone 1, the first voltage ($V_2$) is applied to the zone 3, second voltage ($V_3$) is applied to the zone 5, the third voltage ($V_1$) is applied to the zone 2, and the fourth voltage ($V_4$) is applied to zone 4.

4. An optical pick-up device as set forth in claim 1, characterized in that two liquid crystals are used, being joined to each other so that the directions of the diameters included in the first zones are orthogonal to each other.

5. An optical disc unit characterized in that the pick-up device as set forth in claim 1 is used.

6. An optical pick-up composed of an objective lens and a liquid crystal element in combination, for recording and reproduction of optical discs having different recording densities, the liquid crystal element having seven zones in total, including:

zones 2, 4 located in center parts of half circles of a small diameter beam for a low density optical disc, zones 3, 5 laid along the outer peripheries of the zones 2, 4 within the half circles, respectively, so as to surround the zones 2, 4, respectively, zones 6, 7 along the outer peripheries of the zones 3, 5, between the outer periphery of the small diameter beam and a large diameter beam, extending along substantially half circumferential parts of the small diameter beam, respectively, a zone 1 which is a remaining zone other than the zones 2, 3, 4, 5, 6, 7 and including a diameter, wherein the direction of the diameter included in the first zone 1 is at right angles to a tilt direction to be corrected.

7. An optical pick-up as set forth in claim 6, characterized in that the zones 2 and 4, zones 3 and 5, and zones 6 and 7 are arranged, symmetric to each other, respectively, with respect to the direction of the diameter contained in the zone 1.

8. An optical pick-up as set forth in claim 6, characterized in that there is provided voltage applying means for producing a reference voltage, a first voltage ($V_2$) having a predetermined potential difference to the reference voltage, a second voltage ($V_3$) having an absolute value equal to that of the first voltage ($V_2$) but having a polarity reverse to that of the first voltage ($V_2$), a third voltage ($V_1$) having an absolute value greater than that of the first voltage ($V_2$), and a fourth voltage ($V_4$) having an absolute value equal to that of the third voltage ($V_1$) and having a polarity reverse to that of the third voltage ($V_1$), the reference voltage is applied to the zone 1, the first voltage ($V_2$) is applied to the zones 3 and 6, the second voltage ($V_3$) is applied to the zones 5 and 7, the third voltage ($V_1$) is applied to the zone 2, and the fourth voltage ($V_4$) is applied to zone 4.

9. An optical pick-up device as set forth in claim 6, characterized in that two liquid crystals are used, being joined to each other so that the directions of the diameters included in the first zones are orthogonal to each other.

10. An optical disc unit characterized in that the pick-up device as set forth in claim 6 is used.

11. An optical pick-up composed of an objective lens and a liquid crystal element in combination, for recording and reproduction of optical discs having different recording densities, the liquid crystal element having nine zones in total, including:
zones 2, 4 located in center parts of half circles of a small diameter beam for a low density optical disc,
zones 3, 5 laid along the outer peripheries of the zones 2, 4 within the half circles, respectively, so as to surround the zones 2, 4, respectively,
zones 6, 7 along the outer peripheries of the zones 3, 5, between the outer periphery of the small diameter beam and a large diameter beam, extending along substantially half circumferential parts of the small diameter beam,
zones 8, 9 extending along substantially half circumferential parts of the large diameter beam, respectively,
a first zone which is a remaining zone other than the zones 2, 3, 4, 5, 6, 7, 8, 9 and including a diameter,
wherein the direction of thee diameter included in the first zone 1 is at right angles to a tilt direction to be corrected.

12. An optical pick-up as set forth in claim 11, characterized in that the zones 2 and 4, zones 3 and 5, zones 6 and 7 and zones 8 and 9 are arranged, symmetric to each other, respectively, with respect to the direction of the diameter contained in the zone 1.

13. An optical pick-up as set forth in claim 11, characterized in that there is provided voltage applying means for producing a reference voltage, a first voltage ($V_2$) having a predetermined potential difference to the reference voltage, a second voltage ($V_3$) having an absolute value equal to that of the first voltage ($V_2$) but having a polarity reverse to that of the first voltage ($V_2$), a third voltage ($V_1$) having an absolute value greater than that of the first voltage ($V_2$), and a fourth voltage ($V_4$) having an absolute value equal to that of the third voltage ($V_1$) and having a polarity reverse to that of the third voltage ($V_1$), the reference voltage is applied to the zone 1, the first voltage ($V_2$) is applied to the zones 3 and 6, second voltage ($V_3$) is applied to the zones 5 and 7, the third voltage ($V_1$) is applied to the zones 2 and 9, and the fourth voltage ($V_4$) is applied to zones 4 and 8.

14. An optical pick-up device as set forth in claim 11, characterized in that two liquid crystals are used, being joined to each other so as that the directions of the diameters included in the first zones are orthogonal to each other.

15. An optical disc unit characterized in that the pick-up device as set forth in claim 11 is used.

16. An optical pick-up as set forth in claim 2, characterized in that there is provided voltage applying means for producing a reference voltage, a first voltage (V2) having a predetermined potential difference from the reference voltage, a second voltage (V3) having an absolute value equal to that of the first voltage but having a polarity reverse to that of the first voltage, a third voltage (V1) having an absolute value greater than that of the first voltage, and a fourth voltage (V4) having an absolute value equal to that of the third voltage and having a polarity reverse to that of the third voltage, the reference voltage is applied to the zone 1, the first voltage (V2) is applied to the zone 3, second voltage (V3) is applied to the zone 5, the third voltage V1) is applied to the zone 2, and the fourth voltage (V4) is applied to zone 4.

17. An optical pick-up device as set forth in claim 2, characterized in that two liquid crystals are used, being joined to each other so that the directions of the diameters included in the first zones are orthogonal to each other.

18. An optical pick-up device as set forth in claim 3, characterized in that two liquid crystals are used, being joined to each other so that the directions of the diameters included in the first zones are orthogonal to each other.

19. An optical pick-up device as set forth in claim 16, characterized in that two liquid crystals are used, being joined to each other so that the directions of the diameters included in the first zones are orthogonal to each other.

20. An optical disc unit characterized in that the pick-up device as set forth in of claim 2 is used.

21. An optical disc unit characterized in that the pick-up device as set forth in claim 3 is used.

22. An optical disc unit characterized in that the pick-up device as set forth in claim 4 is used.

23. An optical disc unit characterized in that the pick-up device as set forth in claim 16 is used.

24. An optical disc unit characterized in that the pick-up device as set forth in claim 17 is used.

25. An optical disc unit characterized in that the pick-up device as set forth in claim 18 is used.

26. An optical disc unit characterized in that the pick-up device as set forth in any one of claim 19 is used.

27. An optical pick-up as set forth in claim 7, characterized in that there is provided voltage applying means for producing a reference voltage, a first voltage (V2) having a predetermined potential difference to the reference voltage, a second voltage (V3) having an absolute value equal to that of the first voltage but having a polarity reverse to that of the first voltage, a third voltage (V1) having an absolute value greater than that of the first voltage, and a fourth voltage (V4) having an absolute value equal to that of the third voltage and having a polarity reverse to that of the third voltage, the reference voltage is applied to the zone 1, the first voltage (V2) is applied to the zones 3 and 6, second voltage (V3) is applied to the zones 5 and 7, the third voltage is applied to the zone 2, and the fourth voltage (V4) is applied to zone 4.

28. An optical pick-up device as set forth in claim 7, characterized in that two liquid crystals are used, being joined to each other so that the directions of the diameters included in the first zones are orthogonal to each other.

29. An optical pick-up device as set forth in claim 8, characterized in that two liquid crystals are used, being joined to each other so that the directions of the diameters included in the first zones are orthogonal to each other.

30. An optical pick-up device as set forth in claim 27, characterized in that two liquid crystals are used, being joined to each other so that the directions of the diameters included in the first zones are orthogonal to each other.

31. An optical disc unit characterized in that the pick-up device as set forth in claim 7 is used.

32. An optical disc unit characterized in that the pick-up device as set forth in claim 8 is used.

33. An optical disc unit characterized in that the pick-up device as set forth in claim 9 is used.

34. An optical disc unit characterized in that the pick-up device as set forth in claim 28 is used.

35. An optical disc unit characterized in that the pick-up device as set forth in claim 29 is used.

36. An optical disc unit characterized in that the pick-up device as set forth in claim 30 is used.

37. An optical pick-up as set forth in claim 12, characterized in that there is provided voltage applying means for producing a reference voltage, a first voltage (V2) having a predetermined potential difference to the reference voltage, a second voltage (V3) having an absolute value equal to that of the first voltage but having a polarity reverse to that of the first voltage, a third voltage having an absolute value greater than that of the first voltage, and a fourth voltage (V4) having an absolute value equal to that of the third voltage and having a polarity reverse to that of the third voltage, the reference voltage is applied to the zone 1, the first voltage (V2) is applied to the zones 3 and 6, second voltage (V3) is applied to the zones 5 and 7, the third voltage (V1) is applied to the zones 2 and 9, and the fourth voltage (V4) is applied to zones 4 and 8.

38. An optical pick-up device as set forth in claim 12, characterized in that two liquid crystals are used, being joined to each other so as that the directions of the diameters included in the first zones are orthogonal to each other.

39. An optical pick-up device as set forth in claim 13, characterized in that two liquid crystals are used, being joined to each other so as that the directions of the diameters included in the first zones are orthogonal to each other.

40. An optical pick-up device as set forth in claim 37, characterized in that two liquid crystals are used, being joined to each other so as that the directions of the diameters included in the first zones are orthogonal to each other.

41. An optical disc unit characterized in that the pick-up device as set forth in claim 12 is used.

42. An optical disc unit characterized in that the pick-up device as set forth in claim 13 is used.

43. An optical disc unit characterized in that the pick-up device as set forth in claim 14 is used.

44. An optical disc unit characterized in that the pick-up device as set forth in claim 37 is used.

45. An optical disc unit characterized in that the pick-up device as set forth in claim 38 is used.

46. An optical disc unit characterized in that the pick-up device as set forth in claim 39 is used.

47. An optical disc unit characterized in that the pick-up device as set forth in claim 40 is used.

* * * * *